(12) United States Patent
Gallay et al.

(10) Patent No.: US 6,525,924 B2
(45) Date of Patent: Feb. 25, 2003

(54) DEVICE FOR ACCUMULATING ELECTRICAL ENERGY COMPOSED OF A WINDING OF SUPERIMPOSED STRIPS AND METHOD OF PRODUCTION

(75) Inventors: Roland Gallay, Farvagny (CH); Dominique Guillet, Marly (CH); Vincent Hermann, Fribourg (CH); Adrian Schneuwly, Schmitten (CH)

(73) Assignee: Montena Components S.A., Rossens (CH)

( * ) Notice: Subject to any disclaimer, the term of this patent is extended or adjusted under 35 U.S.C. 154(b) by 0 days.

(21) Appl. No.: 09/966,258

(22) Filed: Oct. 1, 2001

(65) Prior Publication Data

US 2002/0048140 A1 Apr. 25, 2002

(30) Foreign Application Priority Data

Oct. 25, 2000 (EP) .............................. 00810995

(51) Int. Cl.$^7$ ................................ H01G 4/06
(52) U.S. Cl. ................ 361/511; 361/301.1; 361/330; 361/512; 361/502; 361/503
(58) Field of Search .............................. 361/511, 301.3, 361/517, 535, 512, 523, 528, 532, 514, 502, 513, 433, 328, 330

(56) References Cited

U.S. PATENT DOCUMENTS

| 4,447,854 A | * | 5/1984 | Markarian | .................. 361/329 |
|---|---|---|---|---|
| 4,546,415 A | * | 10/1985 | Kent et al. | .................. 361/433 |
| 4,633,369 A | | 12/1986 | Lapp et al. | |
| 5,017,442 A | * | 5/1991 | Watanabe et al. | |
| 6,021,040 A | * | 2/2000 | Suzuki et al. | ................ 361/514 |
| 6,031,713 A | * | 2/2000 | Takeishi et al. | ............ 361/517 |
| 6,054,233 A | * | 4/2000 | Vourlis | |
| 6,282,081 B1 | * | 8/2001 | Takabayashi et al. | |
| 6,307,733 B1 | * | 10/2001 | Maruyama et al. | ......... 361/511 |
| 6,310,756 B1 | * | 10/2001 | Miura et al. | ............. 361/301.3 |
| 6,310,764 B1 | * | 10/2001 | Will et al. | .................. 361/513 |

FOREIGN PATENT DOCUMENTS

| DE | 31 37 593 A1 | 4/1983 |
|---|---|---|
| GB | 1 425 026 A | 2/1976 |

* cited by examiner

Primary Examiner—Anthony Dinkins
Assistant Examiner—Nguyen T. Ha
(74) Attorney, Agent, or Firm—Oliff & Berridge, PLC

(57) ABSTRACT

The invention relates to a device for accumulation of electrical energy. The device is a substantially cylindrical winding of strips. At least one strip is a strip conductor. The device is defined transversally by a substantially cylindrical lateral face and longitudinally by two opposite end faces. Each of the two opposite end faces contains an edge of the strip conductor. In the device, at least one of the edges of at least one strip conductor contains a plurality of teeth. The teeth are disposed on at least one of the end faces and form at least one set in which they are substantially superimposed in a predetermined direction, approximately perpendicular to a plane tangent to the cylindrical face. The teeth constitute a group of elements of electrical connection to a terminal and in which each element extends itself in continuity with the strip conductor which comprises the element.

14 Claims, 3 Drawing Sheets

Figure 1:
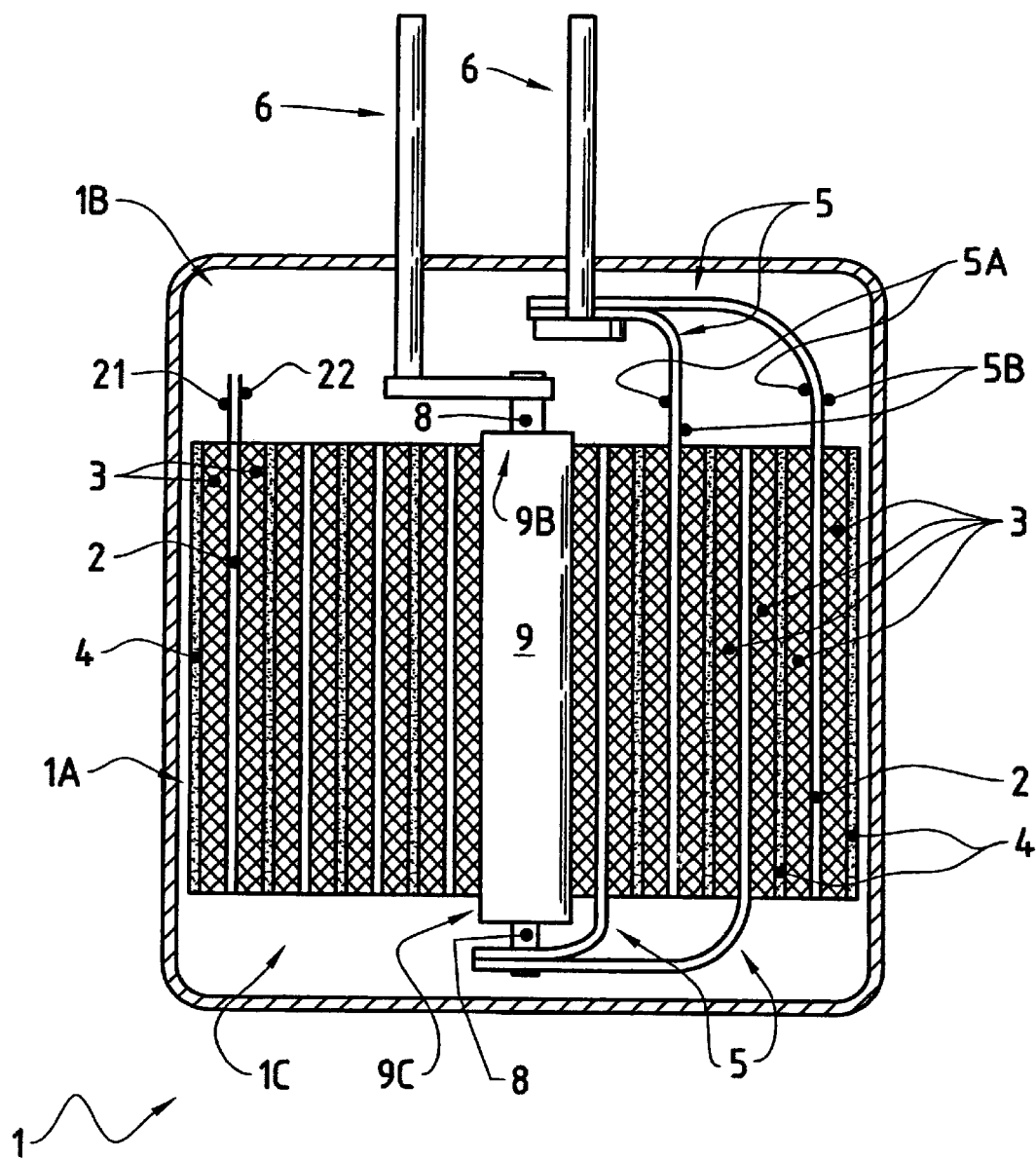

DEVICE FOR ACCUMULATING ELECTRICAL ENERGY COMPOSED OF A WINDING OF SUPERIMPOSED STRIPS AND METHOD OF PRODUCTION

This invention relates to a device for accumulating electrical energy composed of a winding of superimposed strips. The invention also relates to a method for producing a device for accumulating electrical energy composed of a winding of superimposed strips.

The invention applies preferably, but not exclusively, to the production of capacitors of electrochemical type.

Production of capacitors through spiral winding of a plurality of strips of different materials which are preferably superimposed has been known for a long time. Conventionally, two of the strips are of electrically conducting material so as to constitute the two electrodes of the capacitor, and these strip electrodes are each connected by at least one collector element at an electrical connection terminal outside the capacitor.

The windings thus produced are generally of substantially cylindrical shape, generated by rotation or flattened, and have a substantially cylindrical lateral face and two opposite end faces.

These windings are generally covered by a protective sheathing made of an electrically insulating material and to which electrical connection terminals are fixed.

As described in U.S. Pat. No. 4,633,369 for making up collector elements that connect the electrodes to terminals of a capacitor obtained by winding strips or sheets. Known is offsetting the two strip electrodes with respect to a median plane orthogonal to the winding in such a way that after winding, each strip has, at right angles to one of the end faces of the winding, an edge which is free by the amount of the offsetting.

The amount of offsetting is selected in such a way that a metallic element can be crimped, clamped or soldered onto the conducting part formed at each end of the capacitor, and thereby constitute a collector element which itself can be connected to an electrical terminal of the said capacitor.

This technical solution is satisfactory with respect to efficiency of the connection and the section that is established for the current to pass through, but since it is cumbersome, it has serious drawbacks.

An object of the invention is to propose a device for accumulating electrical energy made up of a winding of superimposed strips which does not have the aforementioned drawbacks.

To this end, the invention has as its subject matter a device for accumulating electrical energy comprising a substantially cylindrical winding of strips, at least one of which is an electrical strip conductor, this device being defined transversally by a substantially cylindrical lateral face and longitudinally by two opposite end faces which each include an edge of the said electrical strip conductor. This device is characterized in particular in that at least one of the edges of at least one electrical strip conductor contains a plurality of teeth disposed in such a way that on at least one of the end faces of the device they form at least one set in which they are substantially superimposed in a predetermined direction, approximately perpendicular to a plane tangent to the cylindrical face of the said device, so as to constitute a group of elements of electrical connection to a terminal and in which each element extends in continuity with the electrical strip conductor which comprises it.

The invention also has as its subject matter a method of producing a device of the aforementioned type.

Figure 2:
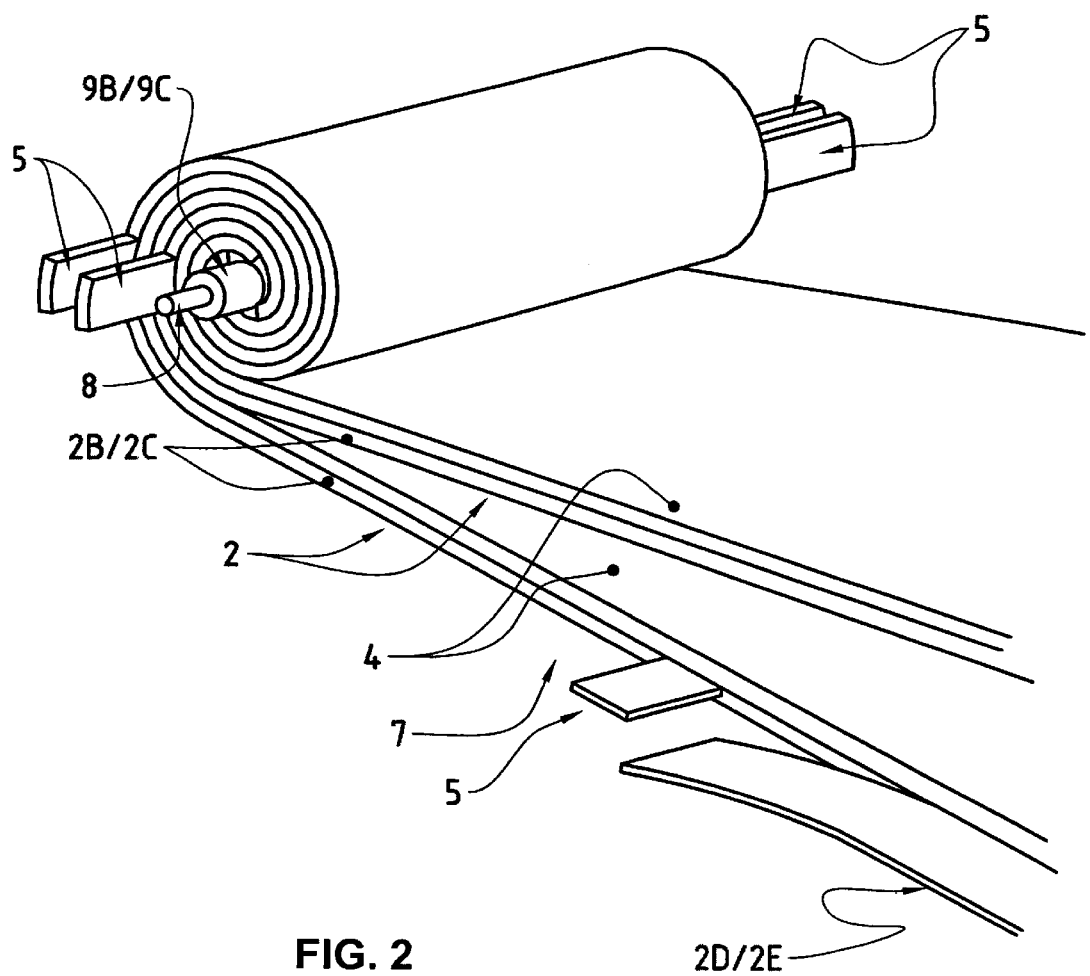
Figure 3A:
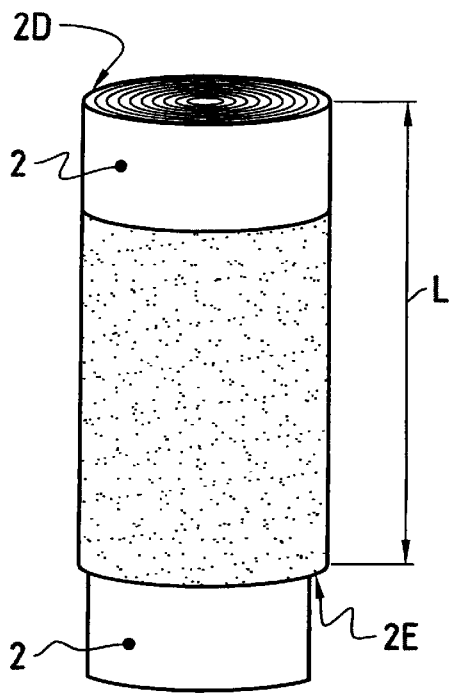
Figure 3B:
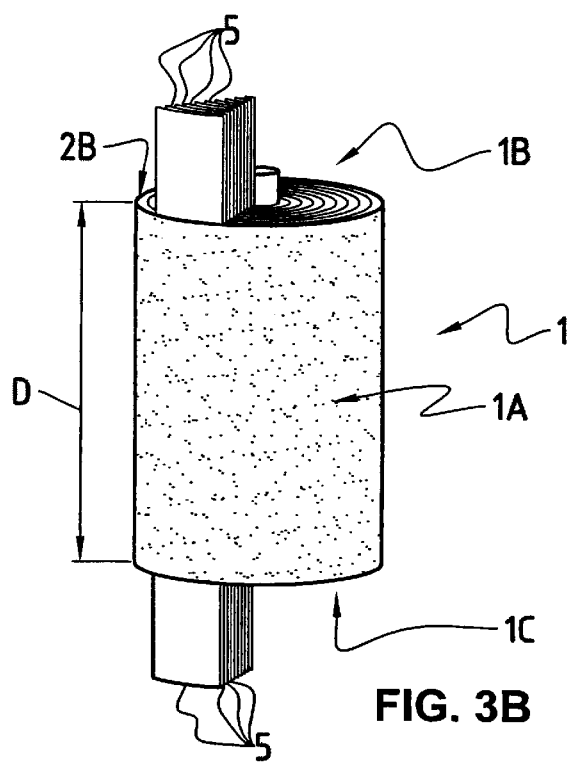
Figure 3C:
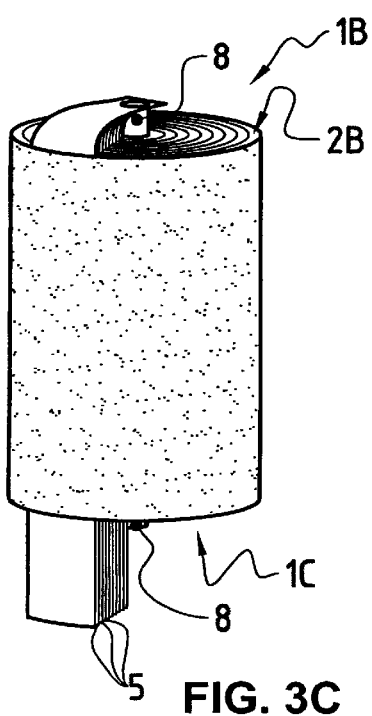
Figure 3D:
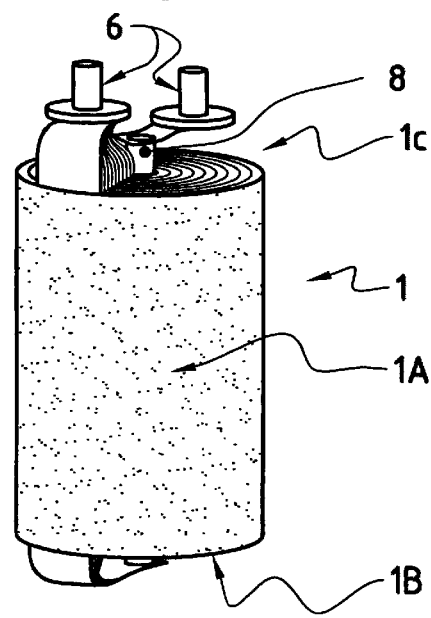

The invention will be better understood from reading the description which follows, given by way of non-limiting example, with reference to the attached drawing representing schematically:

FIG. 1: a view in longitudinal section of a device according to the invention,

FIG. 2: a view in perspective, showing the device according to the invention during its production, according to a preferred embodiment of the method for producing the invention, FIGS. 3A to 3D: four views in perspective of four steps involved in producing the device according to the invention.

Referring to the drawing, one sees a device 1 for accumulating electrical energy comprising a substantially cylindrical winding of strips 2, at least one of which is an electrical strip conductor 2. This device 1 is defined transversally by a substantially cylindrical lateral face 1A and longitudinally by two opposite end faces 1B, 1C which each contain an edge 2B, 2C of the said electrical strip conductor 2.

The device 1 is preferably an electrochemical capacitor made up of a spiral winding of a plurality of superimposed strips 2.

Preferably, but not exclusively, each electrical strip conductor 2 is made of aluminum.

In one embodiment of the invention for producing electrochemical capacitors, the device comprises two electrical strip conductors 2 which are superimposed.

Each electrical strip conductor 2 has two opposite faces 21, 22, one of which 21, referred to as the first, bears a layer 3 of material allowing a high degree of electrochemical activity, and the other 22, referred to as the second, likewise bears a layer 3 of material permitting a high degree of electrochemical activity, itself covered by a layer element 4, referred to as the separator element 4.

The indication according to which each face 21, 22 of the electrical strip conductor 2 bears a layer 3 of material permitting a high degree of electrochemical activity includes in particular the fact that this layer 3 consists of a deposit of material allowing a high degree of electrochemical activity on the said face 21, 22 or an applied strip of material allowing a high degree of electrochemical activity.

Likewise, the indication according to which the second face 22 of the electrical strip conductor 2 bears a layer 3 of material permitting a high degree of electrochemical activity, itself covered by the separator element 4, includes in particular the fact that this separator element 4 consists of a deposit of material on the layer 3 of material permitting a high degree of electrochemical activity or an applied strip of this material.

In the embodiment of the invention for producing electrochemical capacitors, the separator layer 4 consists of a material which is an electrical insulator and an ionic conductor when it is impregnated with an electrolyte agent.

For example, the electrolyte is a liquid or a polymer which impregnates the layers 3 of material permitting a high degree of electrochemical activity and the separator element 4.

In the embodiment of the invention for producing electrochemical capacitors, the material may be, but is not limited to, carbon (activated carbon, graphite, carbon black), rare earth oxides, metal foams, etc.

As shown in the drawing, each of the electrical strip conductors 2 constitutes one of the electrodes of the capacitor, and is connected by at least one electrical connecting element 5 to at least one electrical connection terminal 6 that is external to the capacitor 1.

In the embodiment shown, the device 1 comprises a protective sheathing 1D, made up of a wall 1D, for instance rigid and consisting of electrically insulating material.

This device is noteworthy in that at least one of the edges 2B, 2C of at least one electrical strip conductor 2 bears a plurality of teeth 5 disposed in such a way that on at least one of the end faces 1B, 1C of the device 1, they form at least one set in which they are substantially superimposed in a predetermined direction, approximately perpendicular to a plane tangent to the cylindrical face 1A of the said device, so as to constitute a group of elements 5 of electrical connection to a terminal 6 and in which each element 5 extends in continuity with the strip 2 which comprises it.

These technical features enable the device 1 to be provided with groups of electrical collector elements each constituting an electrical conductor, the transverse cross-section of which is large without any drawback with regard to the volume it occupies on each end face 1B, 1C of the said device 1.

The device 1 for accumulating electrical energy is likewise noteworthy in that, on the one hand, each electrical strip conductor 2, including teeth 5, which is used to make up the device has an initial width L greater than the distance D separating the end faces 1B, 1C of the winding, and, on the other hand, the teeth 5 are obtained by cutting notches 7 in at least one lateral border 2D, 2E of the said electrical strip conductor 2.

Designated by the initial width L of the electrical strip conductor 2 is the width which can be measured between its two lateral borders 2D, 2E before cutting the notches 7.

Conforming to these technical features makes it possible to ensure that each tooth 5 is in continuity with the electrical strip conductor 2 which comprises it and that there is therefore no break in the electrical connection desired.

The device 1 for accumulating electrical energy is also noteworthy in that, on the one hand, in each set where the teeth 5 are superimposed, they are, at least locally, applied tightly against one another by their opposite faces 5A, 5B so as to establish electrical contact between them, and, on the other hand, they are at least indirectly connected to an electrical connection terminal 6, external to the device 1.

Conforming to these technical features makes it possible to establish an electrical connection of high quality with each electrical connection terminal 6, external to the device 1.

The device 1 for accumulating electrical energy is also noteworthy in that in each set where the teeth 5 are superimposed, they are, at least locally, applied tightly against one another by riveting by means of an element 8 inserted through the thickness of the set of said teeth 5.

For example, a spindle 8 is inserted through the thickness of the set of said teeth 5, with its end then deformed in such a way as to lock the assembly.

In a variant, the device for accumulating electrical energy is also noteworthy in that in each set where the teeth 5 are superimposed, they are, at least locally, applied tightly against one another by soldering.

This solution does not exclude use of the aforementioned spindle 8.

In another embodiment, the device 1 comprises at least one set of teeth 5 on each of these end faces 1B, 1C, and each of these sets is connected to a terminal 6 situated at the level of the said face 1B, 1C.

In another embodiment:
the device 1 comprises an electrical conducting element 9 disposed substantially axially with respect to the winding and which has an end 9B, 9C jutting out over each of the end faces 1B, 1C of the device, at the level of a first 1B of the end faces 1B, 1C of the device 1, at least one first set of teeth 5 is connected at least directly to a first end 9B of the conducting element 9 which is situated at the level of this first end face 1B, at the level of the second end face 1C, the second end 9B of the conducting element 9 is, for its part, connected to a first terminal 6, whereas at least a second set of teeth 5 situated at the level of this second face 1C is itself connected to a second terminal 6.

The invention also has as an object a method for producing a device 1 for accumulating electrical energy, on the one hand, defined transversally by a substantially cylindrical lateral face 1A and longitudinally by two opposite end faces 1B, 1C separated by a distance D, and, on the other hand, obtained by winding strips 2 at least one of which being an electrical strip conductor 2 whose initial width L, defined between two lateral borders 2D, 2E, is greater than the distance D that separates the said opposite end faces 1B, 1C.

The method according to the invention is noteworthy in that it is at the latest after the strips 2 have been wound that the teeth 5 are obtained by cutting notches 7 in at least one of the two lateral borders 2D, 2E which determine the initial width L of at least one electrical strip conductor 2.

The notches are made preferably after the winding.

In a variant embodiment, the cutting of at least part of the notches 7 defining each tooth 5 is achieved after the winding of the part of the electrical strip conductor 2 that has to bear this tooth 5.

This technique makes it possible to achieve the teeth as each strip to be provided with teeth is wound, which makes it possible for the winding machines to be operated without any real technical difficulties and without repercussions on the high productivity of this type of machine.

According to an equally noteworthy variant of the method, at least part of the notches 7 which delimit the teeth 5 are obtained prior to the winding of at least one electrical strip conductor 2.

In another embodiment, all the notches 7 that delimit the teeth 5 are achieved prior to the winding of the electrical strip conductor 2.

In a noteworthy way,
the winding of the strips 2 is carried out around an electrical conductor element 9 of length such that it is able, at least after the device has been made, to have one end 9B, 9C jutting out over each of the end faces 1B, 1C of the said device 1, at the latest after the winding, teeth 5 are formed on two electrical strip conductors 2 in such a way that each of the two end faces 1B, 1C of the device 1 is able to be provided with at least one set of teeth 5, at the level of a first end face 1B of the winding, at least one first set of teeth 5 is connected to a first end 9B of the conducting element 9 which is situated at the level of this end face 1B, at the level of the second end face 1C, on the one hand, the second end 9B of the conducing element 9 is connected to a first terminal 6, and, on the other hand, at least one set of teeth 5 situated at the level of this second face is connected to a second terminal 6.

However, this last-mentioned embodiment of the method does not exclude production of devices which are flattened after withdrawal of a removable winding tube on which they have been made beforehand.

In a noteworthy way, at least one electrical strip conductor 2 is used having two opposite faces 21, 22, one of which 21, referred to as the first, bears a layer 3 of material permitting a high degree of electrochemical activity, and the other 22, referred to as the second, likewise bears a layer 3 of material permitting a high degree of electrochemical activity, itself covered by a layer element 4, referred to as separator element 4.

In a likewise noteworthy way, at least one electrical strip conductor 2 is used whose two layers 3 of material permitting a high degree of electrochemical activity and whose separator element 4, which equip the two opposite faces 21, 22, extend from one of the two lateral borders 2D, 2E over a transverse dimension substantially equal to the distance D which separates the two end faces 1B, 1C of the device 1.

To this end, each face 21, 22 of the electrical strip conductor 2 has a portion without covering which is particularly suitable for making teeth 5.

What is claimed is:

1. A device for accumulating electrical energy comprising a substantially cylindrical winding of strips at least one of which is an electrical strip conductor, this device being defined transversally by a substantially cylindrical lateral face and longitudinally by two opposite end faces which each contain an edge of the electrical strip conductor, this device being characterized in that at least one of the edges of at least one electrical strip conductor includes a plurality of teeth disposed in such a way that on at least one of the end faces of the device they form at least one set in which they are substantially superimposed in a predetermined direction, approximately perpendicular to a plane tangent to the cylindrical face of the device, in such a way as to constitute a group of elements of electrical connection to a terminal and in which each element extends in continuity with the electrical strip conductor which comprises the element.

2. The device for accumulating electrical energy according to claim 1, characterized in that, on the one hand, each strip, including teeth, which is used to constitute the device has an initial width (L) greater than the distance (D) which separates the end faces of the winding, and, on the other hand, the teeth are obtained by cutting notches in at least one lateral border of the electrical strip conductor.

3. The device for accumulating electrical energy according to claim 1, characterized in that, on the one hand, in each set where the teeth are superimposed, they are, at least locally, applied tightly against one another by their opposite faces in such a way as to establish electrical contact between them, and, on the other hand, they are at least indirectly connected to an electrical connection terminal, external to the device.

4. The device for accumulating electrical energy according to claim 3, characterized in that in each set where the teeth are situated superimposed, they are, at least locally, applied tightly against one another by riveting by means of an element inserted through the thickness of the set of said teeth.

5. The device for accumulating electrical energy according to claim 3, characterized in that in each set where the teeth are situated superimposed, they are, at least locally, applied tightly against one another by soldering.

6. The device for accumulating electrical energy according to claim 3, characterized in that it comprises at least one set of teeth on each of said end faces, and each of said sets is connected to a terminal situated at the level of the face.

7. The device for accumulating electrical energy according to claim 3, characterized in that
the device 1 further comprises an electrical conducting element disposed substantially axially with respect to the winding and which has an end jutting out over each of the end faces of the device,
at the level of a first of the end faces of the device, at least one first set of teeth is connected at least directly to a first end of the conducting element which is situated at the level of this first end face,
at the level of the second end face, the second end of the conducting element is, for its part, connected to a first terminal, whereas at least a second set of teeth situated at the level of this second face is itself connected to a second terminal.

8. A method of producing a device for accumulating electrical energy the device defined transversally by a substantially cylindrical lateral face and longitudinally by two opposite end faces separated by a distance, the method comprising winding strips at least one of which being an electrical strip conductor whose initial width (L), defined between two lateral borders, is greater than the distance (D) that separates the opposite end faces, this method being characterized in that it is at the latest after the strips have been wound that the teeth are achieved by cutting notches in at least one of the two lateral borders which determine the initial width (L) of at least one electrical strip conductor.

9. The method of production according to claim 8, characterized in that the cutting of at least part of the notches determining each tooth is achieved after the winding of the part of the electrical strip conductor that has to bear this tooth.

10. The method of production according to claim 8, characterized in that at least part of the notches which delimit the teeth are achieved prior to the winding of at least one electrical strip conductor.

11. The method of production according to claim 8, characterized in that all the notches that delimit the teeth are achieved prior to the winding of the electrical strip conductor.

12. A method of producing a device for accumulating electrical energy, the device defined transversally by a substantially cylindrical lateral face and longitudinally by two opposite end faces separated by a distance (D), the method comprising winding strips at least one of which being an electrical strip conductor whose initial width (L), defined between two lateral borders, is greater than a distance (D) that separates the opposite end faces, this method being characterized in that:
the winding of the strips is carried out around an electrical conductor element of length such that it is able, at least after the device has been made, to have one end jutting out over each of the end faces of the device,
at the latest after the winding, teeth are formed on two electrical strip conductors in such a way that each of the two end faces of the device is able to be provided with at least one set of teeth,
at the level of a first end face of the winding, at least one first set of teeth is connected to a first end of the conducting element which is situated at the level of this end face,
at the level of the second end face, on the one hand, the second end of the conducing element is connected to a first terminal, and, on the other hand, at least one set of teeth situated at the level of this second face is connected to a second terminal.

13. The method of production according to claim 8, characterized in that at least one electrical strip conductor is used having two opposite faces, one of which, referred to as the first, bears a layer of material permitting a high degree of electrochemical activity, and the other, referred to as the second, likewise bears a layer of material permitting a high degree of electrochemical activity, itself covered by a layer element, referred to as separator element.

14. The method of production according to claim 13, characterized in that at least one electrical strip conductor is used whose two layers of material permitting a high degree of electrochemical activity and whose separator element, which equip the two opposite faces, extend from one of the two lateral borders over a transverse dimension substantially equal to the distance (D) which separates the two end faces of the device.

\* \* \* \* \*